(12) United States Patent
Chung et al.

(10) Patent No.: US 8,009,643 B2
(45) Date of Patent: Aug. 30, 2011

(54) ANTI-COLLISION METHOD AND SYSTEM IN WIRELESS NETWORK SYSTEM

(75) Inventors: Chang-mo Chung, Yongin-si (KR); Yong-suk Kim, Deajeon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1087 days.

(21) Appl. No.: 11/442,528

(22) Filed: May 30, 2006

(65) Prior Publication Data
US 2007/0116031 A1    May 24, 2007

(30) Foreign Application Priority Data

Nov. 23, 2005  (KR) .................. 10-2005-0112282

(51) Int. Cl.
*H04W 4/00* (2009.01)
(52) U.S. Cl. .............. 370/338; 370/310.2; 370/328; 370/469; 370/311; 370/445

(58) Field of Classification Search .................. 370/338
See application file for complete search history.

(56) References Cited

U.S. PATENT DOCUMENTS

| 6,493,318 B1 * | 12/2002 | Bare .................. 370/238 |
| 2006/0077939 A1 * | 4/2006 | Salokannel et al. .......... 370/338 |

\* cited by examiner

*Primary Examiner* — Kamran Afshar
*Assistant Examiner* — Sayed T Zewari
(74) *Attorney, Agent, or Firm* — Sughrue Mion, PLLC

(57) ABSTRACT

An anti-collision method and system in a wireless network system are provided. The anti-collision method includes: transmitting a beacon signal including information related to an owner type of a first device and information related to an available time interval of the first device; transmitting information related to a time interval selected from the available time interval to a second device having receiving the beacon signal from the first device; and updating the information related to the available time interval using information related to the selected time interval. The information related to the owner type of the first device includes information indicating one of a unicast device and a multicast device.

14 Claims, 8 Drawing Sheets

FIG. 4

Proposed Owner/Type Field Format

| Owner/Type field | Indication |
|---|---|
| 11 | Sender |
| 10 | Receiver (Unicast) |
| 01 | Receiver (Multicast) |
| 00 | Rdserved (Not defined) |

Proposed DRP Control Field Format

| bits: b15 | b14-b13 | b12 | b11-b9 | b8-b6 | b5-b3 | b2-b0 |
|---|---|---|---|---|---|---|
| Reserved | Owner/Target Type | Status | Reason Code | Stream Index | Priority | Type |

FIG. 5 (PRIOR ART)

DRP Availability IE

| 1( Octets) | 1 | 32 |
|---|---|---|
| Element ID | Length (=32) | Availability Bitmap |

FIG. 6

Multicast-specific DRP Availability IE

| 1( Octets) | 1 | 32 |
|---|---|---|
| Element ID | Length (=32) | Multicast-specific Availability Bitmap | ial for an anti-collision is inefficiently allocated.

ANTI-COLLISION METHOD AND SYSTEM IN WIRELESS NETWORK SYSTEM

CROSS-REFERENCE TO RELATED APPLICATIONS

This application claims the benefit of Korean Patent Application No. 2005-112282, filed on Nov. 23, 2005, in the Korean Intellectual Property Office, the disclosure of which is incorporated herein by reference.

BACKGROUND OF THE INVENTION

1. Field of the Invention

The present invention relates to an anti-collision method system in a wireless network system. More particularly, the present invention relates to an anti-collision method and system in a wireless network system taking into consideration the efficiency of a multicast data transmission.

2. Description of the Related Art

FIG. 1 is a view illustrating a collision process in a wireless network system according to the prior art. Referring to FIG. 1, a first device 1 transmits predetermined data to a second device 2. The second device 2 receives the predetermined data from the first device 1 and then transmits an ACK signal. A third device 3 at one hop distance from the second device 2 as well as the first device 1 receives the ACK signal from the second device 2. In a case where a fourth device 4 accidentally transmits predetermined data to the third device 3 in the same time interval, a collision occurs in the third device 3.

The fourth device 4 transmits predetermined data to the third device 3. The third device 3 receives the predetermined data from the fourth device 4 and then transmits an ACK signal. The second device 2 at one hop distance from the third device 3 as well as the fourth device 4 receives the ACK signal from the third device 3. In a case where the first device 1 accidentally transmits predetermined data to the second device 2 in the same time interval, a collision occurs in the second device 2.

FIG. 2 is a view illustrating a principle of an anti-collision method in a wireless network system according to the prior art. A conventional anti-collision method for preventing a collision described with reference to FIG. 1 will now be described with reference to FIG. 2. A second device 2 receives data from a first device 1 and then transmits an ACK signal. The second device 2 also transmits to a third device 3 a beacon signal including information related to an allocated time interval added to a time interval in which the second device 2 receives data from the first device 1 and a time interval in which the second device 2 transmits the ACK signal.

The third device 3 transmits to a fourth device 4 a beacon signal including information related to a time interval in which the third device 3 receives the beacon signal from the second device 2 and a time interval in which the third device 3 transmits the ACK signal added as allocated time intervals to the information related to the allocated time interval received from the second device 2. Thus, the information related to the allocated time intervals can be transmitted to a neighboring node so as to prevent the collision described with reference to FIG. 1.

Here, devices inform neighboring devices at one hop distance of information related to time intervals allocated to them through a distributed reservation protocol information element (DRP IE) and devices at two hop distances of the information through a DRP availability IE.

However, the prior art assumes a unicast data transmission requiring an ACK response. Thus, even in a case of multicast data transmission not requiring an ACK response, a time interval necessary for the ACK response is identified as an allocated time interval.

Accordingly, in the case of multicast data transmission, substantially available time intervals are regarded as time intervals necessary for an ACK response. Thus, a time interval for an anti-collision is inefficiently allocated.

SUMMARY OF THE INVENTION

An aspect of the present general inventive concept is to provide an anti-collision method and system in a wireless network system taking into consideration the efficiency of a multicast data transmission.

According to an aspect of the present invention, there is provided an anti-collision method in a wireless network system, including: transmitting a beacon signal including information related to an owner type of a first device and information related to an available time interval of the first device; receiving, at a second device, information related to a time interval selected from the available time interval, the second device having received the beacon signal from the first device; and updating the information related to the available time interval through information as to the selected time interval. The information related to the owner type of the first device may include information indicating one of a unicast device and a multicast device.

The information related to the owner type of the first device may include information related to one of a receiver and a sender.

The anti-collision method may further include determining whether an available common time interval exists in the available time interval of the first device and an available time interval of the second device.

The anti-collision method may further include transmitting a beacon signal comprising the updated information related to the available time interval.

The information related to the available time interval may be a time interval for transmitting an ACK signal.

According to another aspect of the present invention, there is provided an anti-collision method in a wireless network system, including: transmitting a beacon signal including a multicast-specific DRP IE (distributed reservation protocol information element) including information related to an owner type of a first device and a multicast-specific DRP availability IE including information related to an available time interval of the first device; transmitting information related to a time interval selected from the available time interval to a second device having received the beacon signal from the first device; and updating the information related to the available time interval using information related to the selected time interval. The information related to the owner type of the first device may include information indicating one of a unicast device and a multicast device.

According to another aspect of the present invention, there is provided a device including: a transceiver transmitting a beacon signal including information related to an owner type of the device and information related to an available time interval of the device and receiving information related to a time interval selected from the available time interval by an external device having received the beacon signal; and a time interval manager updating the information related to the available time interval using information related to the selected interval. The information related to the owner type of the device may include information indicating one of a unicast device and a multicast device.

The information related to the owner type of the device may include information indicating one of a receiver and a sender.

The transceiver may transmit a beacon signal comprising the updated information related to the available time interval.

The information related to the available time interval may include a time interval for transmitting an ACK signal.

According to another aspect of the present invention, there is provided a device including: a transceiver transmitting a beacon signal including a multicast-specific DRP IE comprising information related to an owner type of the device and a multicast-specific DRP availability IE including information related to an available time interval of the device and receiving information related to a time interval selected from the available time interval by an external device having received the beacon signal; and a time interval manager updating the information related to the available time interval using information related to the selected interval. The information related to the owner type of the device may include information indicating one of a unicast device and a multicast device.

According to another aspect of the present invention, there is provided a wireless network system including: a first device transmitting a beacon signal including information related to an owner type of a first device and information related to an available time interval; and a second device receiving the beacon signal from the first device to transmit information related to a time interval selected from the available time interval. The first device may update the information related to the available time interval using information related to the selected time interval, and the information related to the owner type of the first device may include information indicating one of a unicast device and a multicast device.

The second device may determine whether an available common time interval exists in the available time interval of the first device and an available time interval thereof.

The first device may transmit a beacon signal comprising the updated information related to the available time interval.

BRIEF DESCRIPTION OF THE DRAWINGS

The above aspects of the present invention will be more apparent by describing certain exemplary embodiments of the present invention with reference to the accompanying drawings, in which:

FIG. 4 is a view illustrating a structure of a DRP IE according to an exemplary embodiment of the present invention;

FIG. 5 is a view illustrating a structure of a DRP availability IE according to the prior art;

FIG. 6 is a view illustrating a structure of a DRP availability IE according to an exemplary embodiment of the present invention;

DETAILED DESCRIPTION OF EXEMPLARY EMBODIMENTS OF THE PRESENT INVENTION

Figure 1:
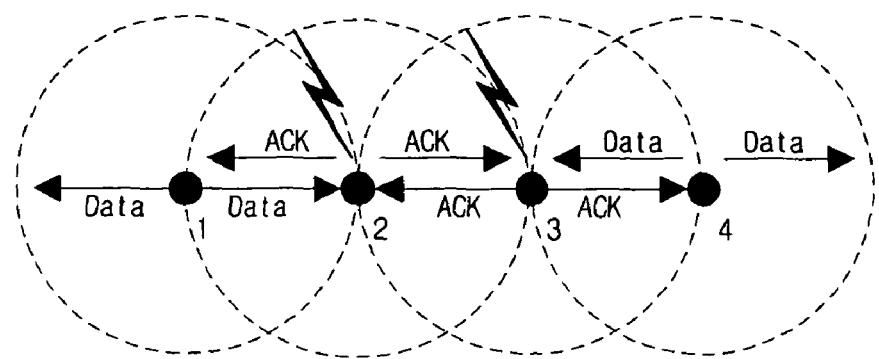
FIG. 1 is a view illustrating a collision process in a wireless network system according to the prior art.
Figure 2:
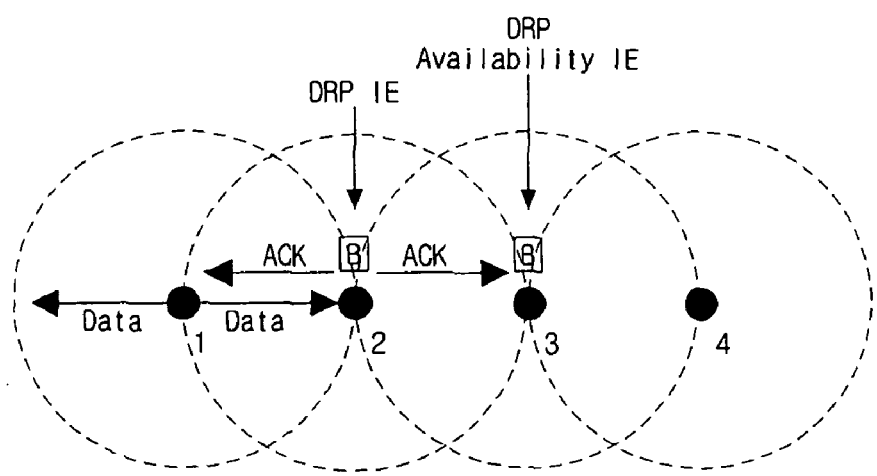
FIG. 2 is a view illustrating a principle of an anti-collision method in a wireless network system according to the prior art.

Exemplary embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that exemplary embodiments of the present invention can be carried out without those defined matters. Also, well-known functions or constructions are not described in detail since they would obscure the invention in unnecessary detail.

An exemplary embodiments of the present invention is characterized in that a beacon signal includes information related to a type of device so as to inform a neighboring device having received the corresponding beacon signal of whether a corresponding device is a multicast device or a unicast device.

In addition, an exemplary embodiment of the present invention is characterized in that the beacon signal includes information related to an available time interval of a device so that a neighboring device having received the corresponding beacon signal uses the available time interval which is considerede necessary for an ACK response.

A beacon signal including information related to a type of a device will now be described. In an exemplary embodiment of the present invention, the information can be transmitted to a neighboring device through a DRP IE. Hereinafter, an exemplary embodiment of the present invention will be described in detail by emphasizing the differences from the prior art.

Figure 3:
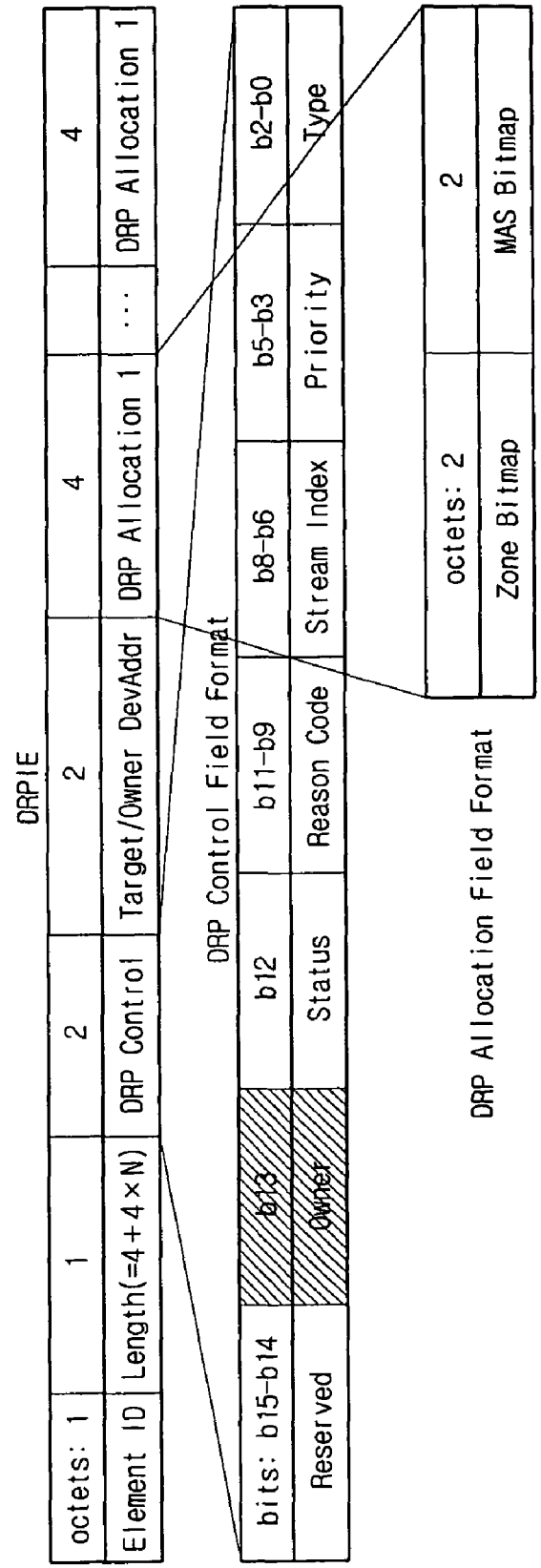
FIG. 3 is a view illustrating a structure of a DRP IE according to the prior art.

FIG. 3 is a view illustrating a structure of a DRP IE according to the prior art.

The DRP IE indicates a status of allocating a time interval and is used to reserve an allocation of the time interval. According to an aspect of the present invention, the time interval may be a medium access slot (MAS), and a superframe having a length of 64 ms may be divided into 16 zones, each of which includes consecutive MASs. Also, 1 MAS corresponds to 256 μs.

Referring to FIG. 3, when a bit value of a status bit item b12 constituting a DRP control 2 of the DRP IE is "0," i.e., S=0, a corresponding MAS is available. When the bit value is "1," i.e., S=1, the corresponding MAS has already been allocated and used.

A bit value of an owner item b13 constituting the DRP control 2 of the DRP IE is "1," a device transmitting the corresponding DRP IE is a sender. When the bit value is "0," the device is a receiver. However, in the structure of the DRP IE according to the prior art, in a case where the device transmitting the corresponding DRP IE is the receiver, whether the receiver is a unicast device or a multicast device cannot be indicated.

FIG. 4 is a view illustrating a structure of a DRP IE according to an exemplary embodiment of the present invention. Referring to FIG. 4, in the DRP IE according to an exemplary embodiment of the present embodiment, a bit of the owner item b13 constituting the DRP control 2 of the DRP IE shown in FIG. 3 is combined with an unused bit b14 to make an item b14-b13 indicating owner type information of a device.

In other words, if a bit value of a corresponding item is "11," a device transmitting the corresponding DRP IE is a sender. If the bit value of the corresponding item is "10," the device is a unicast device functioning as a receiver. If the bit value is "01," the device is a multicast device functioning as the receiver. If the bit value is "00," the device is not defined.

As described above, a structure of a DRP IE can be improved so that a device receiving the DRP IE identifies a device transmitting the DRP IE as a multicast device not transmitting an ACK response signal.

A beacon signal including information related to an available time interval of a device will now be described. In the present invention, the information related to the available time interval of the device can be transmitted to a neighboring device through a DRP availability IE.

FIG. 5 is a view illustrating a structure of a DRP availability IE according to the prior art. The DRP availability IE is formed by accumulating the DRP IE shown in FIG. 3 and indicates a time interval allocated to devices at one hop distance in a super-frame. In other words, available time intervals except the time interval allocated to the devices at one hop distance can be identified through the DRP availability IE.

According to an aspect of the present invention, a time interval may be an MAS, and a bit indicating availability may be allocated to each MAS in a super-frame. Thus, 256 bits necessary for indicating whether 256 MASs are available form an availability bitmap in a DRP availability IE. If a bit value corresponding to each MAS is "0," the bit value indicates an allocated MAS. If the bit value is "1," the bit value indicates an available MAS. However, a multicast device does not need to transmit an ACK response from the DRP availability IE according to the prior art, and devices cannot know about information related to an available MAS. This is because the DRP availability IE according to the prior art indicates available MAS information considering an MAS necessary for an ACK response in a unicast environment, as well as in an available multicast environment.

FIG. 6 is a view illustrating a structure of a DRP availability IE according to an exemplary embodiment of the present invention. In an exemplary embodiment of the present invention, whether a bit indicating availability of each MAS is available in a multicast environment is indicated. In other words, if a bit value is "0," the bit value indicates an MAS allocated in a multicast environment. If the bit value is "1," the bit value indicates an MAS available in the multicast environment.

According to an aspect of the present invention, the availability bitmap formed of 256 bits necessary for indicating the availability of 256 MASs according to the prior art with reference to FIG. 5 may be called a multicast availability bitmap.

In other words, in an exemplary embodiment of the present invention, an ACK response is not required in a multicast environment. Thus, an MAS necessary for the ACK response is identified as an available MAS. As a result, many more available MASs can be used in an exemplary embodiment of the present invention than in the prior art.

For example, a bit value of the item b14-b13 indicating the owner type information of the device constituting the DRP control 2 of the DRP IE shown in FIG. 4 is "01," i.e., a device transmitting a corresponding DRP IE is a multicast device functioning as a receiver, and MASs having corresponding bit values of "1" in the multicast availability bitmap can be identified as MASs available in the multicast environment.

Figure 7:
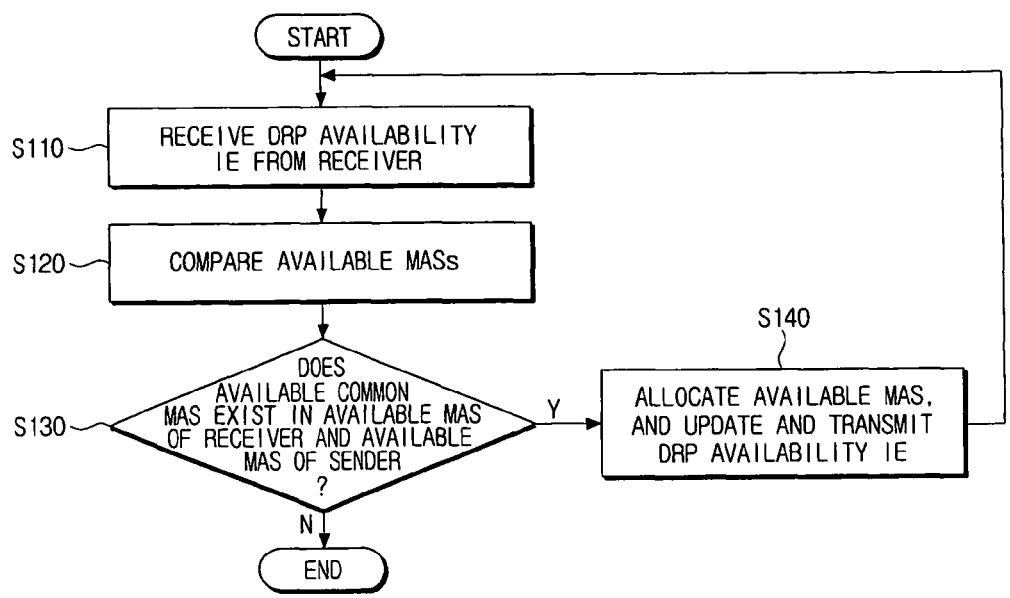
FIG. 7 is a flowchart of an anti-collision method in a wireless network system according to the prior art.

FIG. 7 is a flowchart of an anti-collision method in a wireless network system according to the prior art. Referring to FIG. 7, in operation S110, a sender receives a DRP availability IE from a receiver. In operation S120, the sender identifies an available MAS through an availability bitmap in the DRP availability IE and compares the available MAS with an available MAS identified through a DRP IE thereof.

In operation S130, the sender determines whether an available common MAS exists in the available MAS of the receiver and the available MAS thereof. If the sender determines in operation S130 that the available common MAS exists in the available MAS of the receiver and the available MAS thereof, the sender allocates an MAS selected from the available common MAS to an MAS to which the sender is to transmit a signal in operation S140. Also, the sender adds information as to the allocated MAS to the DRP availability IE received from the receiver to update the DRP availability IE and transmits the updated DRP availability IE to the receiver.

The sender repeats operations S110 through 140. If the sender determines in operation S130 that the available common MAS does not exist in the available MAS of the receiver and the available MAS thereof, the sender ends an MAS allocating process in a corresponding super-frame.

According to the prior art, in a case of a multicast data transmission, a substantially available MAS is regarded as an MAS necessary for an ACK response. Thus, an MAS for an anti-collision is inefficiently allocated.

Figure 8:
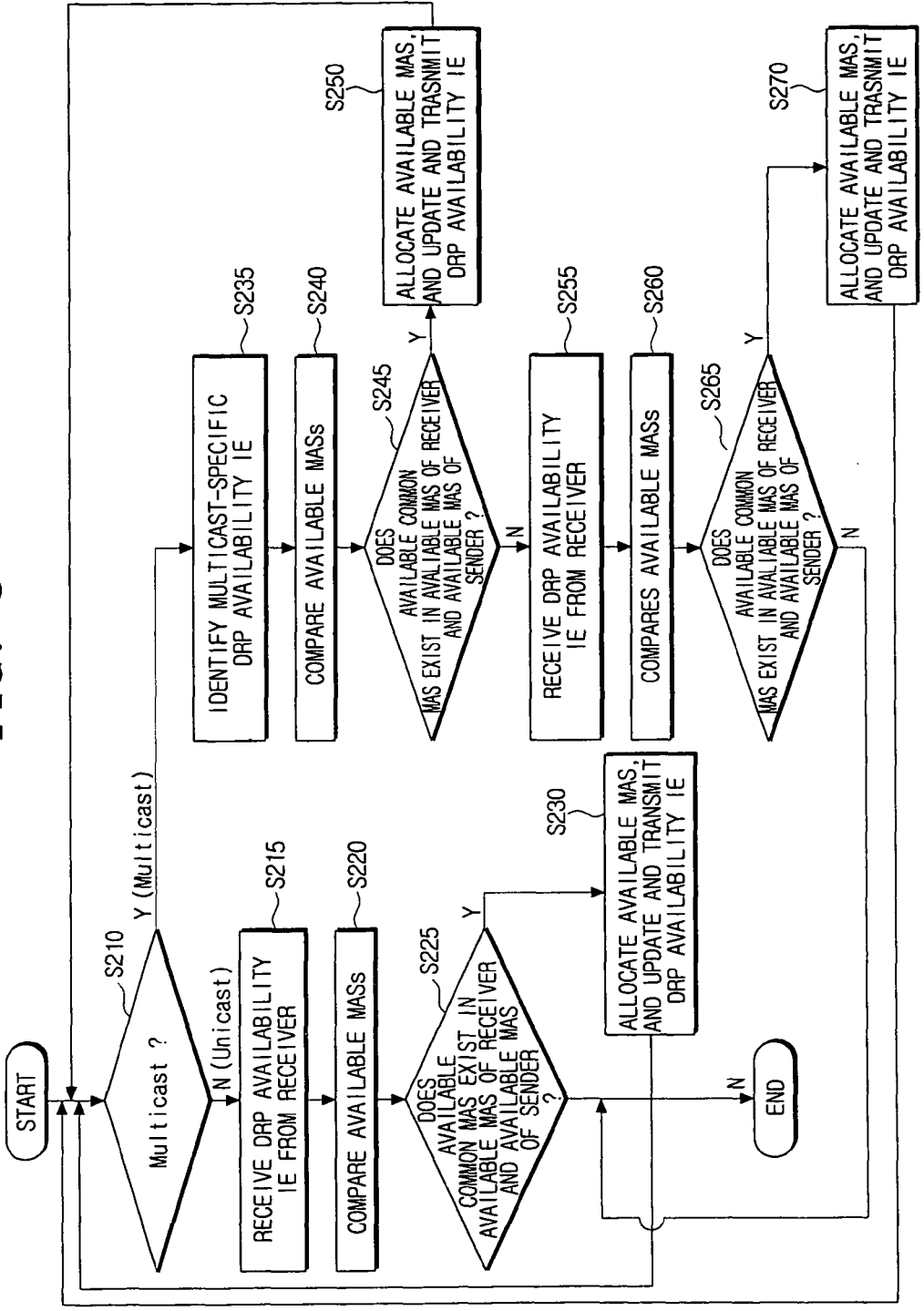
FIG. 8 is a flowchart of an anti-collision method in a wireless network system according to an exemplary embodiment of the present invention.

FIG. 8 is a flowchart of an anti-collision method in a wireless network system according to an exemplary embodiment of the present invention. Devices constituting a wireless network system according to an exemplary embodiment of the present invention can be classified into a receiver and a sender based on a beacon signal. A device according to an exemplary embodiment of the present invention includes a transceiver transmitting a beacon signal to and/or receiving a beacon signal from an external device and an MAS manager managing an available MAS.

Referring to FIG. 8, in operation S210, a receiver determines whether the receiver is a multicast device. If the receiver determines in operation S210 that the receiver is not the multicast device, i.e., the receiver is a unicast device, the receiver transmits a DRP availability IE according to the prior art to a sender, and the sender receives the DRP availability IE from the receiver in operation S215. In operation S220, the sender identifies an available MAS through an availability bitmap in the DRP availability IE and compares the identified available MAS with an available MAS identified through a DRP IE thereof.

In operation S225, the sender determines whether an available common MAS exists in the available MAS of the receiver and the available MAS thereof. If the sender determines in operation S225 that the available common MAS exists in the available MAS of the receiver and the available MAS thereof, the sender allocates an MAS selected from the available common MAS to an MAS to which the sender is to transmit a signal. In operation S230, the sender adds information related to the allocated MAS to the DRP availability IE to update the DRP availability IE and transmits the updated DRP availability IE to the receiver.

The sender performs operation S210 again. If the sender determines in operation S225 that the available common MAS does not exist in the available MAS of the receiver and the available MAS thereof, the sender ends the MAS allocating process in the corresponding super-frame.

If the receiver is a multicast device, the receiver transmits a DRP IE and a DRP availability IE according to an exemplary embodiment of the present invention, i.e., a multicast-specific DRP IE and a multicast-specific DRP availability IE, to the sender. In other words, the receiver transmits a bit value of an item b14-b13 indicating owner type information of a device in a multicast-specific DRP IE shown in FIG. 4 as "01." In an exemplary embodiment of the present invention, in this case, the receiver may transmit a DRP IE and a DRP availability IE according to the prior art.

The sender receives the multicast-specific DRP IE, the multicast-specific DRP availability IE, the DRP IE, and the DRP availability IE from the receiver, identifies a bit value "01" of the item b14-b13 indicating the owner type information of the device in the multicast-specific DRP IE, and determines that the receiver is the multicast device.

In operation S235, the sender identifies the multicast-specific DRP availability IE. In operation S240, the sender identifies an available MAS through an availability bitmap in the multicast-specific DRP availability IE and compares the identified available MAS with an available MAS identified through a DRP IE thereof.

In operation S245, the sender determines whether an available common MAS exists in the available MAS of the receiver and the available MAS thereof. If the sender determines in operation S245 that the available common MAS exists in the available MAS of the receiver and the available MAS thereof, the sender allocates an MAS selected from the available common MAS to an MAS to which the sender is to transmit a signal. In operation S250, the sender adds information as to the allocated MAS to the multicast-specific DRP availability IE received from the receiver to update the multicast-specific DRP availability IE and transmits the updated multicast-specific DRP availability IE to the receiver. The sender performs operation S210 again. If the sender determines in operation S245 that the available common MAS does not exist in the available MAS of the receiver and the available MAS thereof, the sender identifies the DRP availability IE received in operation S235 in operation S255.

In operation S260, the sender identifies an available MAS through an availability bitmap in the DRP availability IE according to the prior art and compares the identified available MAS with an available MAS identified through the DRP IE thereof.

In operation S265, the sender determines whether an available MAS exists in the available MAS of the receiver and the available MAS thereof. If the sender determines in operation S265 that the available common MAS exists in the available MAS of the receiver and the available MAS thereof, the sender allocates an MAS selected from the available common MAS to an MAS to which the sender is to transmit a signal.

In operation S270, the sender adds information as to the allocated MAS to the DRP availability IE received from the receiver to update the DRP availability IE and transmits the updated DRP availability IE to the receiver.

The sender performs operation S210 again. If the sender determines in operation S265 that the available common MAS does not exist in the available MAS of the receiver and the available MAS thereof, the sender ends the MAS allocating process in the corresponding super-frame.

Figure 9A:
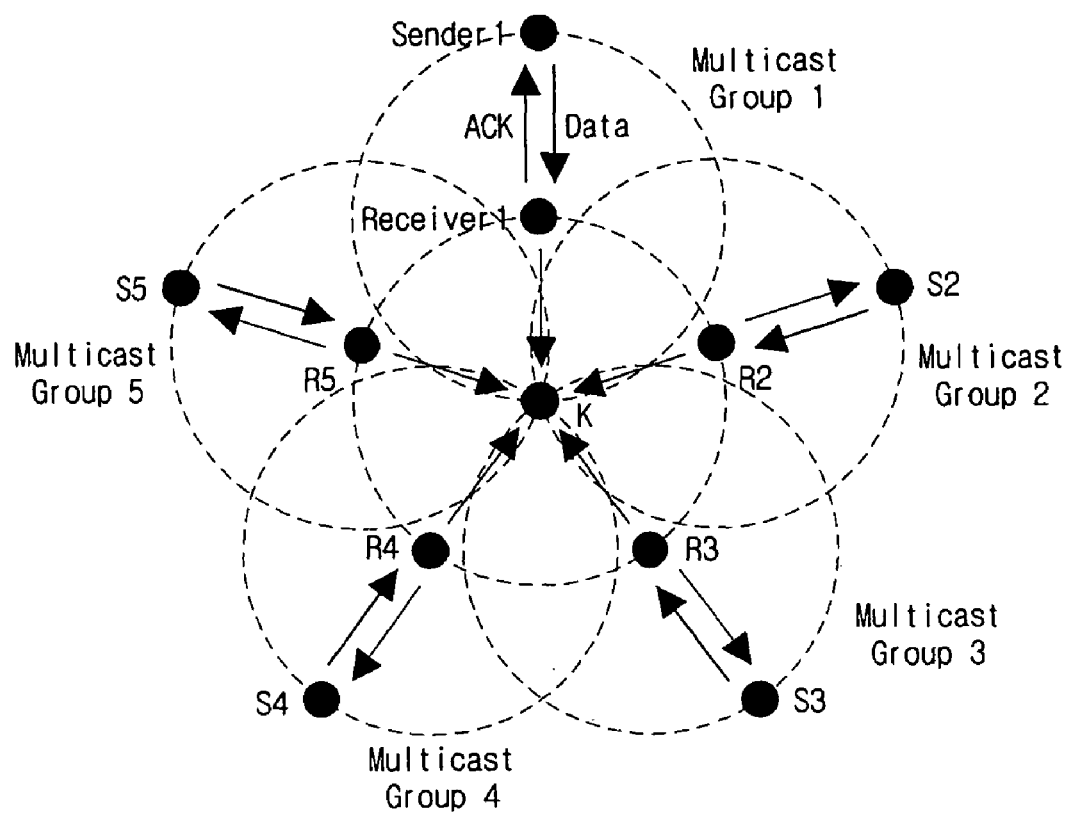
FIG. 9A is a view illustrating an anti-collision method in a wireless network system according to an exemplary embodiment of the present invention.
Figure 9B:
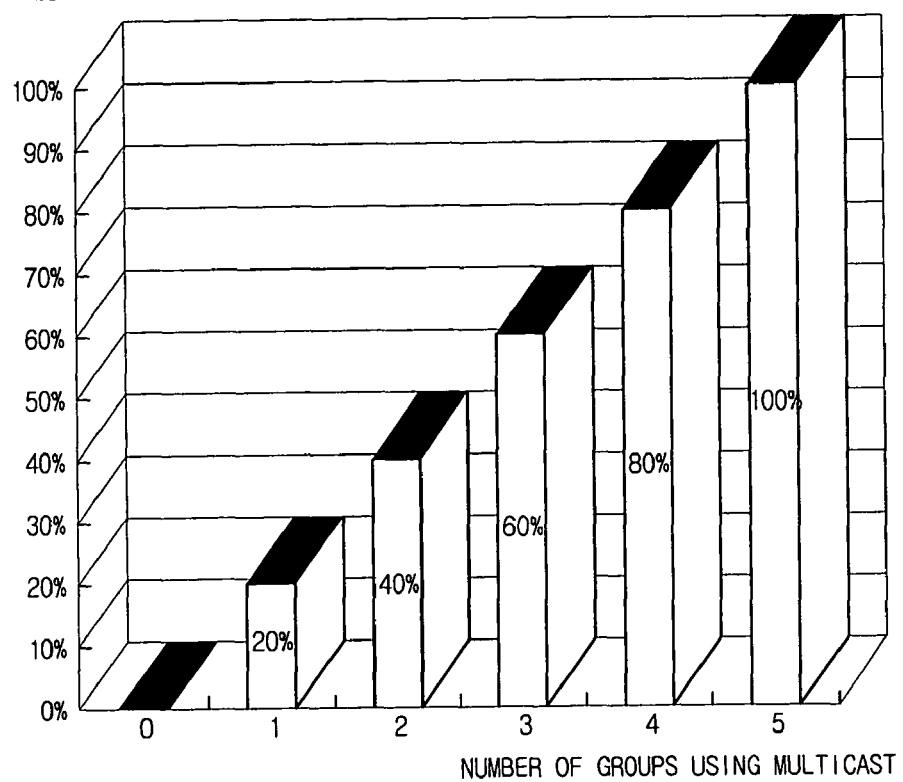
FIG. 9B is a graph illustrating efficiency of the anti-collision method shown in FIG. 9A.

FIG. 9A is a view illustrating an anti-collision method in a wireless network system according to an exemplary embodiment of the present invention, and FIG. 9B is a graph illustrating efficiency of the anti-collision method shown in FIG. 9A.

As shown in FIG. 9A, it is assumed that a beacon uses 6 MASs of 256 MASs corresponding to one super-frame, and first through fifth receivers R1 through R5 each use 50 MASs.

As shown in FIG. 9B, a number of MASs a device K can use is gradually increased with an increase in a number of groups using a multicast.

As described above, according to an exemplary embodiment of the present invention, in a case a multicast data transmission, an MAS necessary for an ACK response can be used as an available MAS. Thus, an MAS for an anti-collision can be efficiently allocated.

The foregoing embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An anti-collision method in a wireless network system, comprising:
   transmitting, by a first device, a first beacon signal comprising information related to a type of a first device and information related to a first available time interval of the first device, the information related to the first available time interval of the first device being different based on the information related to the type of the first device;
   a second device receiving information related to a time interval selected from the first available time interval, the second device having received the first beacon signal from the first device; and
   updating the information related to the first available time interval using information related to the selected time interval,
   wherein the information related to the type of the first device comprises information indicating one of a unicast device and a multicast device.

2. The anti-collision method of claim 1, wherein the information related to the type of the first device comprises information related to one of a receiver and a sender.

3. The anti-collision method of claim 1, further comprising determining whether an available common time interval exists in the first available time interval of the first device and a second available time interval of the second device.

4. The anti-collision method of claim 1, further comprising transmitting a second beacon signal comprising the updated information related to the first available time interval.

5. The anti-collision method of claim 1, wherein the information related to the first available time interval comprises a time interval for transmitting an acknowledgment (ACK) signal.

6. An anti-collision method in a wireless network system, comprising:
   transmitting, by a first device, a beacon signal comprising a multicast-specific DRP IE (distributed reservation protocol information element) comprising information related to a type of a first device and a multicast-specific DRP availability IE comprising information related to an available time interval of the first device, the information related to the available time interval of the first device being different based on the information related to the type of the first device;
   a second device receiving information related to a time interval selected from the available time interval, the second device having received the beacon signal from the first device; and
   updating the information related to the available time interval using information related to the selected time interval, wherein the information related to the type of the first device comprises information indicating one of a unicast device and a multicast device.

7. A device comprising:
a transceiver which transmits a first beacon signal comprising information related to a type of the device and information related to an available time interval of the device and receives information related to a time interval selected from the available time interval by an external device having received the first beacon signal, the information related to the available time interval of the device being different based on the information related to the type of the device; and
a time interval manager updating the information related to the available time interval through information related to the selected interval,
wherein the information related to the type of the device comprises information indicating one of a unicast device and a multicast device.

8. The device of claim 7, wherein the information related to the type of the device comprises information indicating one of a receiver and a sender.

9. The device of claim 7, wherein the transceiver transmits a second beacon signal comprising the updated information related to the available time interval.

10. The device of claim 7, wherein the information related to the available time interval comprises a time interval for transmitting an acknowledgement (ACK) signal.

11. A device comprising:
a transceiver transmitting a beacon signal comprising a multicast-specific distributed reservation protocol information element (DRP IE) comprising information related to a type of the device and a multicast-specific DRP availability IE comprising information related to an available time interval of the device and receiving information related to a time interval selected from the available time interval by an external device having received the beacon signal, the information related to the available time interval of the device being different based on the information related to the type of the device; and
a time interval manager updating the information related to the available time interval using information related to the selected interval,
wherein the information related to the type of the device comprises information indicating one of a unicast device and a multicast device.

12. A wireless network system comprising:
a first device transmitting a beacon signal comprising information related to a type of the first device and information related to a first available time interval, the information related to the first available time interval being different based on the information related the type of the first device; and
a second device receiving the beacon signal from the first device to transmit information related to a time interval selected from the first available time interval,
wherein the first device updates the information related to the first available time interval using the information related to the selected time interval, and
wherein the information related to the type of the first device comprises information indicating one of a unicast device and a multicast device.

13. The wireless network system of claim 12, wherein the second device determines whether an available common time interval exists in the first available time interval of the first device and a second available time interval of the second device.

14. The wireless network system of claim 12, wherein the first device transmits a beacon signal comprising the updated information related to the available time interval.

* * * * *